UNITED STATES PATENT OFFICE.

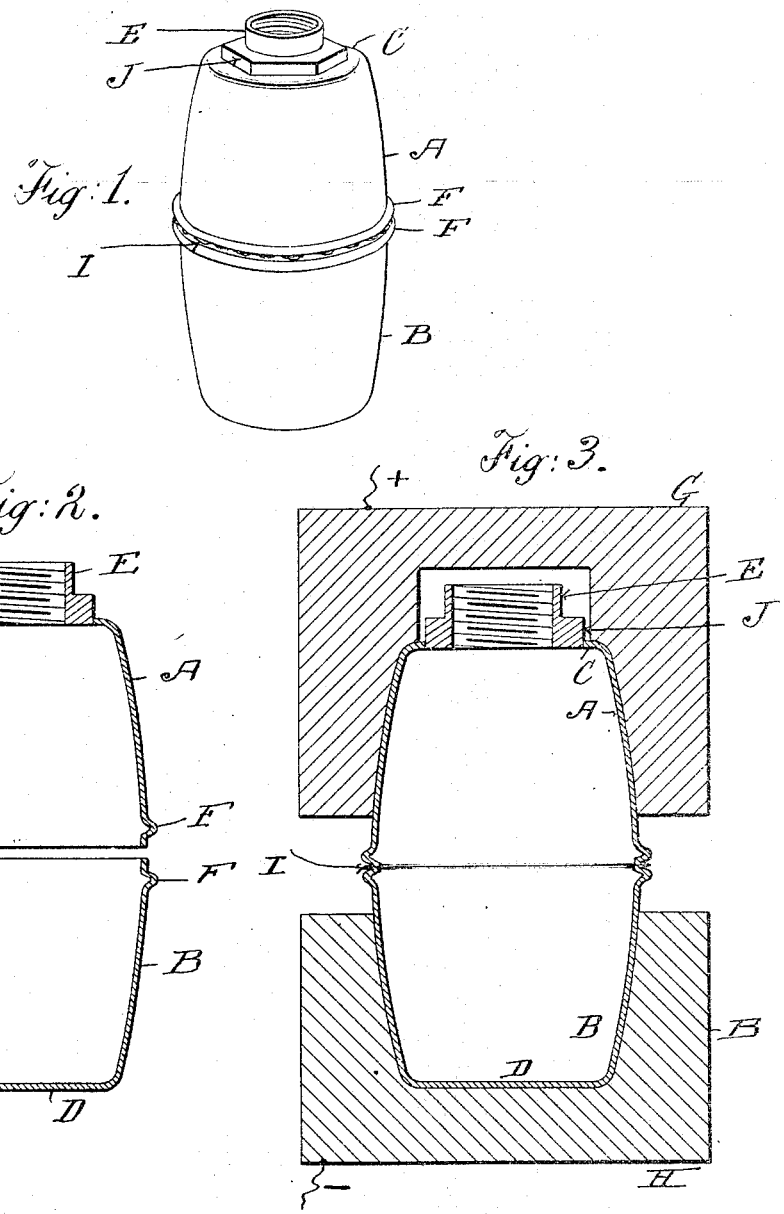

THOMAS E. MURRAY, JR., AND JOSEPH B. MURRAY, OF BROOKLYN, NEW YORK.

HAND-GRENADE SHELL AND METHOD OF MAKING THE SAME.

1,273,525.          Specification of Letters Patent.      Patented July 23, 1918.

Application filed March 28, 1918. Serial No. 225,160.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Hand-Grenade Shells and Methods of Making the Same, of which the following is a specification.

The invention is a hand grenade shell of thin or sheet metal and the method of making the same.

A hand grenade is an explosive projectile manually thrown over short distances. Such grenades at the present time are being made by the million, and, therefore, it is of much economical importance to reduce their cost of manufacture.

We construct the grenade of two cup-shaped portions, struck up, pressed or otherwise produced from sheet metal, electrically welded together at their circumferential edges. The pressure exerted at the welded joint causes an extrusion of the metal or bur surrounding said joint. Such burs when formed at welded joints are usually removed by cutting, grinding or a like operation, the expense of which when performed upon grenade shells made, as before stated, in such large numbers, amounts to very considerable figures. We eliminate this operation altogether, and leave the bur in place. But a rough projection, such as a bur, is liable to cut the hand of, and so disturb the aim of the person throwing the grenade. To give, therefore, to the shell the proper smooth or finished surface and to prevent the hand of the operator coming in contact with the bur, we produce on each cup-portion and near the circumferential edge thereof a raised integral bead, which beads when the cups are welded together lie on each side of the bur, and we regulate the welding so that the bur shall not protrude beyond said beads, and is thus completely guarded by said beads.

In the accompanying drawings—

Figure 1 is a perspective view of our hand grenade shell. Fig. 2 is a longitudinal section thereof with the cup-shaped parts separated before welding. Fig. 3 is a similar view, showing the parts in the welding electrodes, and after welding.

Similar letters of reference indicate like parts.

The grenade shell is formed of two cups A, B of thin metal, the said cups preferably having flattened ends C, D, and one of said cups, as A, having an opening in its end C in which is secured the internally threaded tube E for the reception of the usual exploding fuse. On each cup and near the circumferential edge thereof is formed an integral raised circumferential bead F. The cups A, B are placed in suitable recesses in electrodes G, H with their edges in contact, and, the welding current being established, are pressed together. By reason of said welding and pressure, any metal extruded at the joint forms a bur or ridge I. The welding operation is to be so regulated as that said bur I shall not protrude beyond the beads F, F between which it lies. The said beads, therefore, form a guard for the bur, and prevent the hand of the operator throwing the grenade from contacting with said bur—or, in other words, cause the grenade to have a substantially smooth surface enabling it to be tightly grasped and projected without interference by the usually rough metal of the bur. One end, as D, of the shell is flattened so that the shell may be stood upon it. The fuse tube E is provided with a polygonal flange J, for convenience in holding the shell by means of a suitable spanner or wrench applied to said flange during the screwing of the fuse into said tube.

We claim:

1. A hand grenade shell consisting of two cup-shaped metal portions electrically welded together at their circumferential edges, and, on each portion and near the circumferential edge thereof, an integral raised circumferential bead; whereby the bur of metal extruded at the welded joint is guarded by said beads, substantially as set forth.

2. The method of making a hand grenade shell of thin metal, which consists in electrically welding together at their circumferential edges two cup-shaped portions, each portion having an integral circumferential raised bead near its circumferential edge, and pressing said portions together to produce a bur of metal on the exterior of the joint, the amount of protrusion of which bur shall be less than the protrusion of said beads.

In testimony whereof we have affixed our signatures in presence of two witnesses.

THOMAS E. MURRAY, Jr.
JOSEPH B. MURRAY.

Witnesses:
GERTRUDE T. PORTER,
MAX T. McGARRY.